Patent text page …

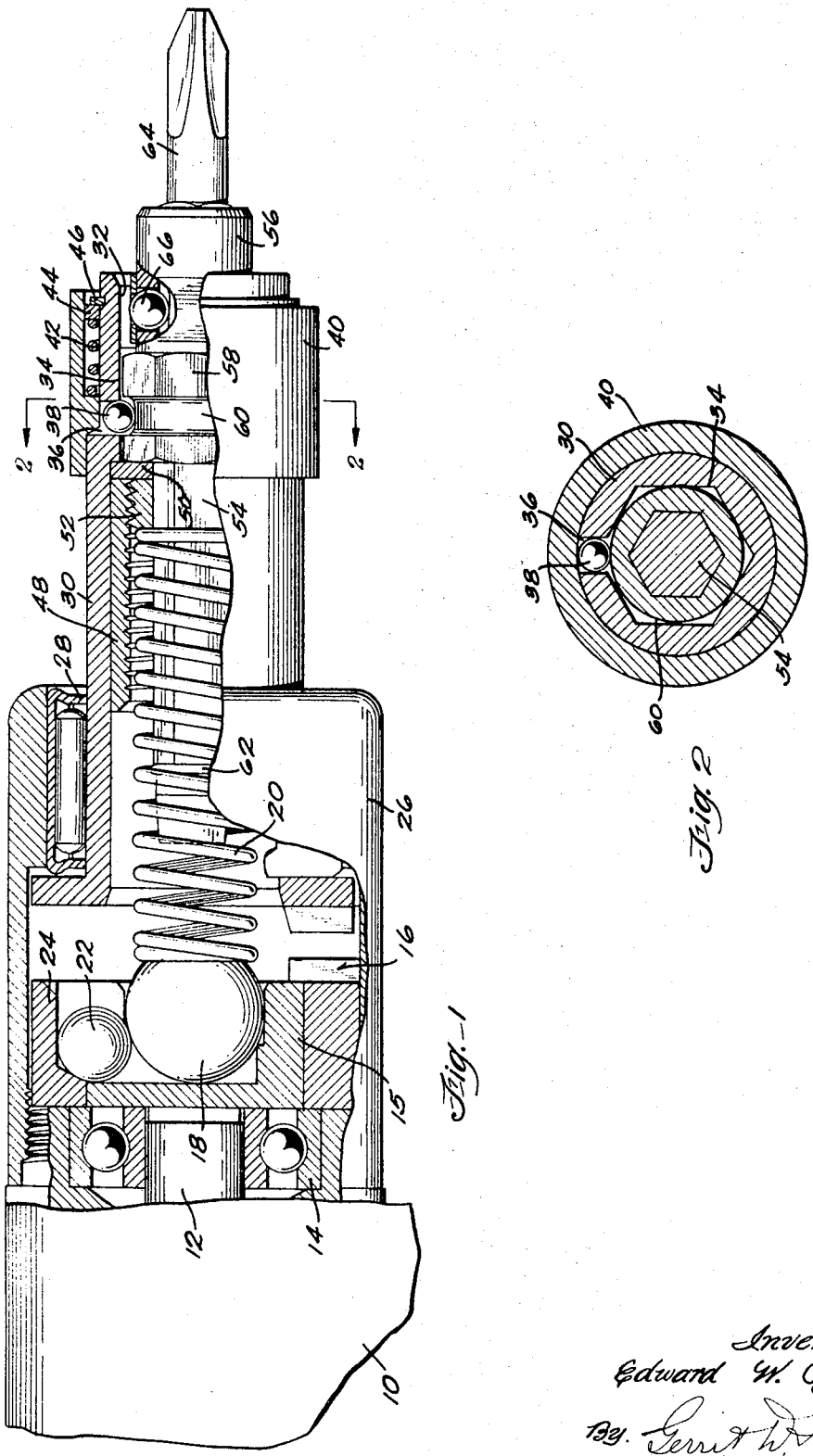

United States Patent Office 3,451,514
Patented June 24, 1969

3,451,514
ADJUSTABLE TORQUE CONTROLLED RELEASE CLUTCH FOR POWER DRIVEN TOOLS
Edward W. Ristow, Wauwatosa, Wis., assignor to Milwaukee Electric Tool Corporation, Waukesha County, Wis., a corporation of Wisconsin
Filed Dec. 4, 1967, Ser. No. 687,899
Int. Cl. B25b 21/00; F16d 7/02, 43/20
U.S. Cl. 192—56    5 Claims

ABSTRACT OF THE DISCLOSURE

This disclosure consists of a spring operated torque controlled release clutch of well-known design mounted in the chuck driver assembly of a portable power driven rotary tool. The spring is adjusted by rotating a threaded plug also mounted in such assembly. The rotation of such plug is accomplished by manipulating a chuck with a long hex shaft slidably and nonrotatably passing through such plug. The release of such chuck from the chuck driver is accomplished by releasing a ball lock and sliding the chuck axially from its driving connection from such driver to thereupon permit the relative rotation necessary to adjust such plug.

BACKGROUND OF THE INVENTION

Field of the invention

This invention has utility in portable power driven tools of the type especially designed to drive screws or thread nuts. The invention more particularly resides in the means for adjusting the tension on the spring of a well-known torque controlled ball type release clutch.

Description of the prior art

The well-known spring biased ball type of release clutch used with this invention is shown and described in detail in U.S. Patents 2,475,518 and 2,854,831. However, the adjustment of the compression spring in 2,475,518 requires removal of the screwdriver held in the chuck and the use of a separate tool. In 2,854,831 the adjustment was accomplished by a complicated and relatively expensive threaded collar and pin and slot arrangement.

SUMMARY OF THE INVENTION

The essence of this invention lies in using the chuck not only for holding and driving the screw driving and nut running tools but also for adjusting the spring tension adjusting plug or screw. To accomplish this the adjusting plug is provided with a hex hole and the chuck has an elongated hex stem which slides axially through such hole and transmits rotational force to such plug. The chuck is held in driving relation with the chuck driver by a ball and sleeve arrangement. When this is released the chuck may be moved axially until its rotational drive connection with the chuck driver is disengaged. Then it may be rotated to the chuck driver to adjust the plug and the spring tenison. The operation of this invention, after such adjustment of the tension, and the structural elements required for such operation are fully described and shown in said aforementioned U.S. patents.

BRIEF DESCRIPTION OF THE DRAWING

In the drawing:
FIG. 1 is a fragmentary view partly in plan and partly in section of a portable power driven rotary tool having an adjustable spring operated torque controlled release clutch embodying the present invention; and
FIG. 2 is a sectional view taken on the line 2—2 of FIG. 1.

DESCRIPTION OF THE PREFERRED EMBODIMENT

Referring to the drawing by reference numerals the power driven rotary tool of well-known design has a forward casing 10 from which a driving spindle 12 projects into a guiding ball bearing 14. This spindle operates the inner element 15 of a spring biased ball type release clutch designated generally at 16. Such ball type clutch is well-known and is described in detail in U.S. Patent 2,854,831. This clutch is engaged when axial pressure or forward thrust is applied to the rotary tool during normal operation. When the rotary driving torque becomes too great due, for example, to the setting of a screw or nut, the master ball 18 will be forced against a compression type torque limiting spring 20 by the radially inward movement of three small drive balls 22 which is caused by the clutch collar 24 when it ceases to rotate at the same speed as the inner element 15.

The release clutch is contained within a sleeve 26 threadedly mounted on the neck of the casing 10. This sleeve has an outer end in which is mounted a needle bearing 28 which rotatably and slidably supports a chuck driver 30.

When this chuck driver is moved inwardly as thrust is applied to a screwdriver, nut runner or other tool, jaws on the chuck driver engage with jaws on the clutch collar 24 to rotate the chuck driver. The forward end of the chuck driver has an outer cylindrical bore 32 and an inner hexagonal broached bore 34 of slightly less diameter. The purpose of the broached bore 34 is to engage the chuck for driving purposes. The purpose of the cylindrical bore is to permit the chuck to be rotated for spring tension adjustment as hereinafter described. The chuck driver has an opening 36 through its wall which accommodates a chuck retaining ball 38. This ball is retained in the inner locking position shown in FIGS. 1 and 2 by chuck retainer 40 which is spring biased to retaining position by a spring 42 acting between an internal shoulder and spring retaining washer 44 and retaining ring 46.

An essential feature of this invention is the means for adjusting the the compression resisting force of the torque limiting spring 20. To this end there is brazed wiihin the body of the chuck driver 30 an internally threaded insert 48. This insert preferably has a 9⁄16–18 UNF class 1 thread. The outer end of the inert is seated against a washer 50 thereby providing a stop for an adjusting screw 52 threadedly engaged with such internally threaded insert. The end of the spring 20 bears against such screw and as such screw is turned relative to the insert it will, in easily controlled small increments, move axially inwardly of the insert to compress the spring 20 and increase the resistance of the release clutch 16, so that greater torque is delivered to the work engaging tool. The adjusting screw 52 has a broached hexagonal opening accommodating the hexagonal shank 54 of the chuck 56. This chuck has hexagonal driven section 58 provided with a ball receiving groove 60 which, in the locked position shown, is engaged by hexagonal bore 34 of the driver 30 to transmit rotational force to the chuck. When the chuck retainer 40 is slid axially outwardly against the spring 42 the ball 38 is free to move out of the groove 60 and the forward end of the chuck 56 (or a tool locked therein) may be grasped and the chuck slid axially outwardly until the hexagonal driven section 58 is out of the broached bore 34. In this position such chuck can be rotated relative to the insert 48 to rotate the adjusting screw 52 and move it axially to change the setting of spring 20. A retaining washer 62 on the inner end of the shank 54 keeps the chuck from being accidentally fully withdrawn.

For illustrative purposes, a screwdriver 64 is shown seated in the chuck 56 and frictionally held in place by the usual ball and spring arrangement indicated at 66.

The advantages of this means of adjusting the compression spring are:

(1) positive and fine adjustment;
(2) rugged and relatively inexpensive construction; and
(3) elimination of (a) the removal of the work contacting tool in order to make the adjustment; and (b) the use of a separate tool for such adjustment.

I claim:

1. An adjuster for a spring biased ball type release clutch mounted in the sleeve housing and hollow chuck driver of a portable power driven rotary tool comprising:
   a hollow chuck driver having an internal threaded portion and a non-round chuck engaging internal part;
   a compression spring for a ball type release clutch mounted in said hollow chuck driver;
   a threaded adjusting screw operable in said internal threaded portion in thrust engagement with said spring and having a centrally located non-round bore;
   a chuck having an elongated non-round stem non-rotatably and slidably mounted in said non-round bore, said chuck being adapted for receiving operating tools and having a non-round section non-rotatably and slidably engaged with said chuck engaging internal part, said non-round section being disengaged from said non-round chuck engaging internal part of said chuck driver upon limited axial movement of said chuck relative thereto to permit relative rotation therebetween for turning said adjusting screw relative to said internal thread portion to adjust the force exerted by said compression spring; and
   locking and unlocking means for holding said chuck in relative non-rotatable axial position.

2. An adjuster as set forth in claim 1 wherein:
said internal threaded portion and said threaded adjusting screw have UNF class 1 threads.

3. An adjuster as set forth in claim 1 wherein:
the bore of said threaded adjusting screw is hexagonal; and
the elongated stem of said chuck is hexagonal with a sliding and non-rotating fit in said bore.

4. An adjuster as set forth in claim 3 wherein:
said chuck driver has an outer internal cylindrical part and an adjacent inner hexagonal part; and
said chuck has a hexagonal driven section meshing with said inner hexagonal part and rotatable within said internal cylindrical part.

5. An adjuster as set forth in claim 4 wherein:
said hexagonal driven section has a ball receiving groove;
said hollow chuck driver has an opening through its wall accommodating a retaining ball; and
a spring biased chuck retainer is mounted on said hollow chuck driver to normally keep said ball in said opening and groove and prevent axial movement between said chuck driver and chuck, said chuck retainer being movable to ball release position to allow relative axial movement of said chuck driver and chuck whereby said chuck may be rotated relative to said chuck driver to rotate said adjusting screw.

References Cited

UNITED STATES PATENTS

| | | | |
|---|---|---|---|
| 1,657,274 | 1/1928 | Niedhammer | 64—29 XR |
| 1,757,125 | 5/1930 | Levedahl | 173—13 |
| 2,263,709 | 11/1941 | Van Sittert | 192—56 |
| 2,475,518 | 7/1949 | Ristow | 192—56 |
| 2,732,746 | 1/1956 | Livermont | 192—56 XR |
| 2,854,831 | 10/1958 | Rothweiler | 64—29 |
| 2,857,997 | 10/1958 | Graybill | 192—56 |
| 3,119,247 | 1/1964 | Grabovac | 64—29 |
| 3,187,865 | 6/1965 | Blachowski | 192—56 |
| 3,220,526 | 11/1965 | Gattiker | 192—56 XR |
| 3,277,670 | 10/1966 | Bent | 192—56 XR |

BENJAMIN W. WYCHE III, *Primary Examiner.*

L. J. PAYNE, *Assistant Examiner.*

U.S. Cl. X.R.

64—29; 73—139; 81—52.4; 192—111